Dec. 19, 1961 R. R. BETHAM 3,013,918
ADHESION PRODUCT AND METHOD OF MANUFACTURE
Filed Aug. 9, 1957
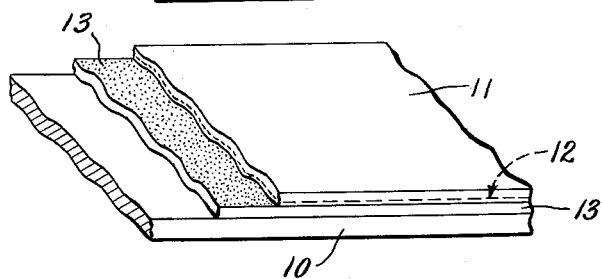
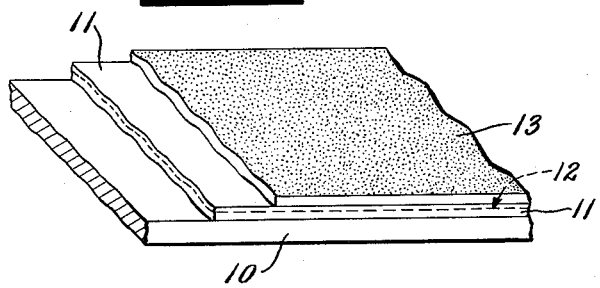
INVENTOR.
ROBERT R. BETHAM
BY
Bohleber, Jarrett + Montstream
ATTORNEYS

3,013,918
ADHESION PRODUCT AND METHOD OF MANUFACTURE
Robert R. Betham, Middlesex, N.J.
(Lincoln Blvd. and River Road, Bound Brook, N.J.)
Filed Aug. 9, 1957, Ser. No. 677,292
7 Claims. (Cl. 154—46.8)

The invention relates to an adhesive product of new form and having a number of very desirable features. The invention also relates to the method of manufacture of the adhesive product.

It is an object of the invention to provide an adhesive product which is moisture proof and hence will withstand adverse weather conditions. Additional objects are a product which will not fade and which will receive printing.

Another object of the invention is to provide an adhesive product which is considerably thinner than such products heretofore known.

Another object is to produce an adhesive product which is inexpensive.

Another object is to provide a new method of manufacture of an adhesive product.

A still further object is to provide a new method of manufacture of an adhesive product which results in a moisture proof product as well as a non-fading product and a product which will receive printing.

Another object is to provide a new method of manufacture of an adhesive product which is considerably thinner than products of this type heretofore known.

Another object is to provide an adhesive product of lacquer with a porous reinforcing sheet at least partially embedded therein and an adhesive on the surface thereof.

Other objects of the invention will be more apparent from the following description when taken in connection with the accompanying drawing illustrating a preferred construction thereof in which:

FIG. 1 is a perspective view of one form of the adhesive product;

FIG. 2 is the same product as FIG. 1 but with reverse coiling which brings the adhesive between the sheets making up the product.

In the manufacture of new adhesive product, a release sheet 10 is used which may be of any suitable material such as paper and with both surfaces having a low adherency. The release sheet may inherently have such surface, however, usually the surfaces are treated with known materials to secure such low adherency. Glassine paper is a well known release sheet which is suitable for the method and the product to be described herein. Many other suitable release sheets are known.

A layer or coating of a material 11 which is initially fluid and hardens or dries into a flexible sheet is laid over one surface of the release sheet and while the material is still fluid or wet, a porous reinforcing sheet 12 is laid into the wet or fluid material so that the latter penetrates at least a part of the thickness of the reinforcing sheet. The fluid material is one which produces a non-blocking flexible film. The release sheet, therefore, serves a double purpose first as a release sheet and secondly as a supporting sheet or surface for the fluid material while the reinforcing sheet is laid on or in the material. The fluid material may be of any color and there are many different types. The porous reinforcing sheet may be of absorbent paper, woven or non-woven fabric, rope tissue, Jap paper and many others are suitable. For a thin transfer product the reinforcing sheet should be thin such as thin Jap paper. Suitable fluid materials which are moisture proof and flexible when dried are the lacquers such as vinylite, cellulose acetate, ethyl acetate, nitrocellulose, ethyl cellulose, tri-acetate and a great many others. Any plasticizer or solvent used should be of such a nature that it does not break down the adhesive or the release surface of the release sheet. The layer of fluid material or lacquer on the release sheet with the reinforcing sheet laid on or in the fluid material is then dried. Drying may be accomplished in any way such as by air drying or application of heat. The dried material with the reinforcing sheet embedded therein is a combined sheet and becomes the adhesive carrier or carrier sheet.

When the fluid material or lacquer has dried, a layer or coating of adhesive 13 is then laid over the surface of the combined sheet formed by the dried or hardened lacquer and the reinforcing sheet and the adhesive is dried. There are many suitable adhesives and the pressure sensitive or ever-tacky type is a common form such as polyvinyl ether, crude and reclaimed rubber, synthetic rubbers such as "Vistanex" or polyisobutylene, G.R.S., G.R.I., Hycar, and many others. The adhesive may be one which can be reactivated by heat or a solvent. It is important, however, that the adhesive, the adhesive carrier and the low adherence surface of the release sheet be compatible as well as any plasticizer which may be used. These should not interact to affect the desired characteristic of any other part of the product. The desired characteristics are easy separation of the release sheet from the adhesive carrier and from the adhesive, the strength and flexibility of the carrier and as in the preferred material the moisture proof or moisture resistance of the carrier, and the adhesive character of the adhesive.

After the adhesive has been dried, the sheet may be wound upon itself with either the adhesive outwardly or the transfer sheet outwardly. With the adhesive on the outside and stripping off the transfer sheet from the roll, one has a product as shown in FIG. 2. If, however, the adhesion product after completion is wound with the adhesive on the inside and then the release sheet 10 is stripped for one revolution and cut off at the end, then the adhesion product may be unwound as in FIG. 1 with the carrier or lacquer surface 11 on top and the adhesive layer being between the lacquer and the release sheet 10. When ready to use the transfer sheet is stripped off thereby exposing the adhesive layer. In using the transfer adhesive product, it may be unrolled from the coil to expose the adhesive surface and used as a complete layer including the transfer sheet. The preferred method of use, however, is to strip off the release sheet leaving a carrier or lacquer layer having the reinforcing sheet embedded at least partially therein and with the adhesive on the surface of the combined or carrier sheet.

This transfer adhesive product may be very thin in that it measures about 2½ to 3 thousandths of an inch thick when a thin reinforcing sheet such as Jap paper is used as compared to 6 thousandths of an inch for such products heretofore known. The carrier strip or sheet is moisture proof if the hardened material in which the reinforcing sheet is embedded is a lacquer, that is, it is unaffected by or strongly resistant to moisture and to weather so that it does not deteriorate or does not deteriorate over a long period of time when exposed to outdoor or moist conditions. The combined strip or sheet will readily take printing matter. The lacque used may be of any color including white. The layer of lacquer reinforced with the reinforcing sheet at least partially embedded into the dried lacquer gives strength to the carrier strip or sheet. As is known, the sheets may be cut into strips or rolls of any desired width.

This invention is presented to fill a need for improvements in an adhesion product and method of manufacture. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A method of making a transfer adhesive product comprising coating one surface of a release sheet of a thickness and flexibility to be rolled with a fluid material of a fluidity to be absorbed by a porous sheet and both surfaces of which release sheet are of low adherency to the hardened fluid material, laying a porous reinforcing sheet on the fluid material which penetrates at least partially into the reinforcing sheet, drying the fluid material into a reinforced layer, and applying an adhesive over the reinforced layer, the surfaces of the release sheet having low adherence with respect to the adhesive.

2. A method as in claim 1 in which the coating of fluid material is a coating of lacquer.

3. A method as in claim 1 including drying the adhesive.

4. A transferable adhesive product comprising a release sheet of a thinness and flexibility to be rolled having opposite surfaces, a layer of flexible dried material on a surface of the release sheet, a reinforcing sheet of flexible porous material permanently and at least substantially embedded in the dried material, the reinforcing sheet having a thickness approximately the same as the layer of dried material, a layer of adhesive upon the layer of dried material with its reinforcing sheet, the layer of dried material with its reinforcing sheet having good adherency with the adhesive, one of the layers being in contact with the release sheet, the release sheet surfaces having a low adherency to both the layer of dried material and the adhesive and the release sheet surfaces and the dried material and the adhesive being compatible with each other.

5. A transferable adhesive product comprising a release sheet of a thinness and flexibility to be rolled having opposite surfaces, a combined sheet on a surface of the release sheet including a dried material and a porous reinforcing sheet permanently and approximately or fully embedded in the dried material, a layer of adhesive on the combined sheet, the release sheet surfaces having a low adherency with respect to both the dried material and the adhesive, the combined sheet having good adherency with respect to the adhesive, and the release sheet surfaces and the dried material and the adhesive being compatible with each other.

6. A transferable adhesive product as in claim 4 in which the dried material is a lacquer.

7. A transfer adhesive product as in claim 6 in which the release sheet and layer of dried material are flexible and the product is in roll form being rolled upon itself.

References Cited in the file of this patent

UNITED STATES PATENTS

| | | |
|---|---|---|
| 1,958,792 | Kubin | May 15, 1934 |
| 2,191,704 | Bennett | Feb. 27, 1940 |
| 2,532,011 | Dahlquist et al. | Nov. 28, 1950 |
| 2,607,711 | Hendricks | Aug. 19, 1952 |
| 2,622,991 | Sturm | Dec. 23, 1952 |
| 2,764,556 | Pahl et al. | Apr. 6, 1954 |
| 2,769,742 | Helbing | Nov. 6, 1956 |
| 2,822,290 | Webber | Feb. 4, 1958 |
| 2,829,073 | Williams | Apr. 1, 1958 |
| 2,838,421 | Sohl | June 10, 1958 |